United States Patent
Hu et al.

(10) Patent No.: US 9,307,462 B2
(45) Date of Patent: Apr. 5, 2016

(54) REFERENCE SIGNAL POWER MEASUREMENT AND REPORTING FOR IMPROVING PERFORMANCE IN A NETWORK WITH GEOGRAPHICALLY SEPARATED ANTENNA PORTS

(75) Inventors: Yang Hu, Beijing (CN); Shaohua Li, Beijing (CN); Xinghua Song, Beijing (CN)

(73) Assignee: TELEFONAKTIEBOLAGET L M ERICSSON, Stockholm (SE)

( * ) Notice: Subject to any disclaimer, the term of this patent is extended or adjusted under 35 U.S.C. 154(b) by 78 days.

(21) Appl. No.: 14/342,933

(22) PCT Filed: Sep. 5, 2012

(86) PCT No.: PCT/IB2012/054589
§ 371 (c)(1),
(2), (4) Date: Mar. 5, 2014

(87) PCT Pub. No.: WO2013/035052
PCT Pub. Date: Mar. 14, 2013

(65) Prior Publication Data
US 2014/0211656 A1      Jul. 31, 2014

(30) Foreign Application Priority Data
Sep. 5, 2011   (CN) .......................... 2011 1 0279288

(51) Int. Cl.
*H04W 24/00* (2009.01)
*H04W 80/04* (2009.01)
*H04W 36/00* (2009.01)

(52) U.S. Cl.
CPC ................. *H04W 36/0083* (2013.01)

(58) Field of Classification Search
CPC ...... H04W 24/00; H04W 80/04; H04W 52/40
See application file for complete search history.

(56) References Cited

U.S. PATENT DOCUMENTS

| | | | |
|---|---|---|---|
| 2012/0057488 A1* | 3/2012 | Li et al. | 370/252 |
| 2012/0163318 A1* | 6/2012 | Kishiyama et al. | 370/329 |

(Continued)

FOREIGN PATENT DOCUMENTS

| | | |
|---|---|---|
| EP | 2 164 186 A2 | 3/2010 |
| EP | 2 346 290 A1 | 7/2011 |
| WO | 2010/037285 A1 | 4/2010 |
| WO | 2012/021274 A2 | 2/2012 |

OTHER PUBLICATIONS

ERICSSON. Considerations on Real-Life DL MIMO Aspects. 3GPP TSG-RAN WG1 #64. R1-111330 Barcelona, Spain, May 9-May 13, 2011.

(Continued)

*Primary Examiner* — Andrew Lee
(74) *Attorney, Agent, or Firm* — Patents on Demand, P.A.; Brian K. Buchheit; Scott M. Garrett

(57) ABSTRACT

Devices and methods for improving performance in a network with geographically separated antenna ports based on determining arid reporting reference signal power from a communication device to a base station are provided. In one aspect, the difference between received reference signal power values is used in determining a reported reference signal power value, such as reference signal received power (RSRP) in a Multiple-Input Multiple-Output (MIMO) network including geographically separated antenna ports transmitting on cell-specific reference signal (CBS) ports 0 and 1. Devices and methods for measuring and reporting per-port reference signal power values are provided.

20 Claims, 12 Drawing Sheets

(56) References Cited

U.S. PATENT DOCUMENTS

| | | | |
|---|---|---|---|
| 2012/0213095 A1* | 8/2012 | Krishnamurthy et al. | 370/252 |
| 2012/0307768 A1* | 12/2012 | Xu et al. | 370/329 |
| 2013/0163451 A1* | 6/2013 | Rousu et al. | 370/252 |
| 2013/0225188 A1* | 8/2013 | Seo et al. | 455/450 |
| 2014/0126436 A1* | 5/2014 | Safavi et al. | 370/295 |
| 2014/0141799 A1* | 5/2014 | Rousu et al. | 455/456.1 |
| 2014/0162717 A1* | 6/2014 | Liu | 455/522 |
| 2014/0235909 A1* | 8/2014 | Shimizu et al. | 585/12 |
| 2015/0003346 A1* | 1/2015 | Kim et al. | 370/329 |
| 2015/0171947 A1* | 6/2015 | Sun et al. | 370/329 |

OTHER PUBLICATIONS

3rd Generation Partnership Project; Technical Specification Group Radio Access Network; Evolved Universal Terrestrial Radio Access (E-UTRA); Physical layer; Measurements (Release 10). 3GPP TS 36.214 V10.0.0 (Dec. 2010).

3rd Generation Partnership Project; Technical Specification Group Radio Access Network; Evolved Universal Terrestrial Radio Access (E-UTRA); Physical Channels and Modulation (Release 10). 3GPP TS 36.211 V10.1.0 (Mar. 2011).

3rd Generation Partnership Project; Technical Specification Group Radio Access Network; Evolved Universal Terrestrial Radio Access (E-UTRA); Physical layer procedures (Release 10). 3GPP TS 36.213 V10.1.0 (Mar. 2011).

3rd Generation Partnership Project; Technical Specification Group Radio Access Network; Evolved Universal Terrestrial Radio Access (E-UTRA); Radio Resource Control (RRC); Protocol specification (Release 10). 3GPP TS 36.331 V10.1.0 (Mar. 2011).

* cited by examiner

○ – Antenna Port 0

⊚ – Antenna Port 1

FIG. 3A

REFERENCE SIGNAL POWER MEASUREMENT AND REPORTING FOR IMPROVING PERFORMANCE IN A NETWORK WITH GEOGRAPHICALLY SEPARATED ANTENNA PORTS

This application claims the benefit of International Application No. PCT/IB2012/054589, filed Sep. 5, 2012, the disclosure of which is fully incorporated herein by reference.

TECHNICAL FIELD

The present invention relates generally to telecommunication networks, and more particularly, to a method and device for improving performance in a network with geographically separated antenna ports based on determining and reporting reference signal power from a communication device to a base station.

BACKGROUND

3GPP Long Term Evolution (LTE) is a standard for mobile phone network technology. LTE is a set of enhancements to the Universal Mobile Telecommunications System (UMTS), and is a technology for realizing high-speed packet-based communication that can reach high data rates on both downlink and uplink channels.

LTE may be deployed in a number of configurations such as Multiple-Input, Multiple-Output (MIMO) radio systems, including distributed antenna systems. An exemplary MIMO system including a base station and user equipment (UE) is shown in FIG. 1. In MIMO transmission systems, a transmitter sends multiple streams of data by multiple transmit antennas according to frequency and time-domain modulation schemes. Accordingly, in order for the receiver to determine channel impulse responses from each antenna, known reference signals are sequentially transmitted, for instance, as shown in FIG. 2.

Distributed antenna systems ensure cell coverage by deploying many antennas at different locations. In a distributed antenna system, each antenna may transmit on all antenna ports of the cell. However, distributed antennas may be limited to communications on a single antenna port. In this case, different antenna ports may sometimes correspond to physical antennas that are geographically separated from one another.

LTE is regarded as a next generation mobile communication system, but is still relatively young. As such, unforeseen challenges continue to arise in the field as deployment of LTE continues to grow. One particular challenge has arisen with respect to the measurement and reporting of reference signal received power (RSRP) in an LTE network having geographically separated antenna ports.

In an LTE deployment, RSRP provides a cell-specific signal strength metric. This metric is used, for instance, to rank different LTE candidate cells according to their signal strength or as an input for handover and cell reselection decisions. According to the LTE specification, RSRP is defined for a specific cell as the linear average over the power contributions of the resource elements (RE) which carry cell-specific reference signals (CRS) within the considered measurement frequency bandwidth. Further, according to the LTE specification, the CRS transmitted on the first antenna port (i.e. CRS port 0) is normally used for RSRP determination. However, the CRS transmitted on the second antenna port (i.e. CRS port 1) can also be used if available.

In a typical LTE communication system, there are a total of 4 CRS ports for the support of downlink MIMO transmission. Each of the four CRS ports are orthogonal to each other and an example showing CRS port 0 and CRS port 1, having a normal cyclic prefix, is shown in FIG. 2.

Referring now to FIG. 3A, an indoor scenario with interleaved antenna ports, i.e., geographically separated antenna ports, is illustrated. As shown in FIG. 3A, alternating antennas transmit on antenna port 0 (CRS port 0), while the other antennas transmit on antenna port 1 (CRS port 1). An advantage of an interleaved antenna port deployment is an increase in cell coverage, while minimizing the need for additional cabling. This is particularly advantageous when upgrading existing passive distributed antenna systems to support MIMO operation. Use of an interleaved antenna port arrangement, as shown in FIG. 3A, halves the number of antennas used in a distributed MIMO deployment compared to a deployment using two co-located antennas (ports 0 and 1) per site.

However, as shown in FIGS. 3B and 3C and reported in further detail in "Consideration of Real-Life DL MIMO Aspects," 3GPP TSP-RAN WG1 #64, R1-111330 (2011), depending on the positioning of a user equipment (UE) communication device relative to the locations of interleaved antenna ports 0 and 1, the difference in received reference signal power can be over 25 dB. This is due to, for instance, the disparate path lengths a reference signal travels from each antenna port to the exemplary UE. In contrast, for co-located CRS ports, the RSRP for CRS port 0 and port 1 is generally similar. In FIG. 3C, the RSRP for a UE communication device is plotted based on: 1) the measured value for port 0; 2) an average of the measured values for ports 0 and 1; and 3) the maximum measured value for port 0 or 1. It is clear that the reported RSRP value based on an averaging method has roughly 3 dB of mismatch with the true RSRP value in situations where the UE communication device is close to either antenna port 0 or port 1.

The mismatch between reported and actual RSRP in an interleaved antenna port configuration can have significant side effects with respect to system performance. For instance, cell-coverage may be reduced, hand-off efficiency may be reduced, and data transmission and power settings may not be optimized due to inaccurate, and thus, overly conservative reporting of RSRP. Similarly, overly conservative modulation and coding schemes may be implemented, reducing throughput. Moreover, path loss, which is used in determining uplink power control, is based on the reported RSRP from a UE. Accordingly, interference may be increased due to unnecessarily large uplink transmit power settings that are the result of artificially low reported power values.

Accordingly, there is a need for a method and device for improving performance in a network with geographically separated antenna ports.

SUMMARY

Particular embodiments of the present invention are directed to devices and methods for improving performance in a network with geographically separated antenna ports based on determining and reporting reference signal power to a base station.

In one particular aspect, a method for improving performance in a network includes receiving, from a base station, a first reference signal associated with a first antenna port of the base station and determining a first reference signal power value for the received signal. The method further includes receiving, from the base station, a second reference signal associated with a second antenna port of the base station and determining a second reference signal power value for the received second reference signal. Then, the difference between the first reference signal power value and the second reference signal power value is determined, which is used to determine a third reference signal power value for the communication device. This third reference signal power value is then reported to the base station as the measured reference signal power.

In some embodiments, if the difference between the first and second determined reference signal power values is less than or equal to a predetermined threshold, the method further includes averaging the two values. This average value is then reported to the base station as the measured reference signal power value for the communication device. However, if the determined difference is greater than a predetermined threshold, a maximum value is determined by comparing the first reference signal power value and the second reference signal power value. This maximum value is then reported to the base station as the measured reference signal power value for the communication device.

Particular embodiments of the present invention provide a communication device operable in a network with a plurality of geographically separated antenna ports associated with a base station. The communication device includes at least a processor, a memory, a transceiver coupled to the processor, and an antenna coupled to the transceiver. According to an aspect of the present invention, the processor is configured to determine a first reference signal power value based on a first reference signal received on the antenna, which is received from one of the geographically separated antenna ports. The processor is further configured to determine a second reference signal power value based on a second reference signal received on the antenna, which is received from a second of the geographically separated antenna ports. Additionally, the processor is configured to determine the difference between the first and second reference signal power values and determine a third reference signal power value, for the communication device, based on the difference. The processor then reports the third value to the base station.

In some embodiments, if the difference is less than or equal to a predetermined threshold, the processor determines the average of the first and second reference signal power values and reports it to the base station. However, if the difference is greater than the threshold value, the processor is configured to determine a maximum value by comparing the first and second reference signal power values. The maximum value is then reported to the base station as a representative power value for the communication device.

In another aspect, particular embodiments of the disclosed methods include determining and reporting port-specific reference signal power values. A method for improving performance in a network with geographically separated antenna ports, based on determining and reporting reference signal power from a communication device to a base station, is provided. The method includes receiving, from the base station, a first reference signal associated with a first antenna port of the base station and determining a first reference signal power value for the signal. The method further includes receiving, from the base station, a second reference signal associated with a second antenna port of the base station and determining a second reference signal power value for the second signal. According to the method, the reference signal power values are reported in a manner that indicates which antenna port is associated with each of the reference signals used to determine the respective reference signal power values.

Particular embodiments of the present invention include a communication device, operable in a communication system with a plurality of geographically separated antenna ports, than includes at least a processor, a memory, a transceiver coupled to the processor; and an antenna coupled to the transceiver. The processor is configured to determine a first reference signal power value based on a first reference signal received on the antenna, wherein the first reference signal is received from one of the geographically separated antenna ports. The processor is also configured to determine a second reference signal power value based on a second reference signal received on the antenna, wherein the second reference signal is received from a second geographically separated antenna port. The processor is also configured to report the first and second reference signal power values in a manner that indicates the respective antenna ports associated with the reference signals used to determine each of the reference signal power values.

According to another aspect of the present invention, a method for improving performance in a network with geographically separated antenna ports, based on receiving reference signal power values from a communication device, is provided. The method includes transmitting, from a base station, a reference signal to the communication device; receiving a reference signal power value for the communication device; determining which of the antenna ports is associated with the received reference signal power value; and determining, based on the reported reference signal power value, a transmission quality value for the antenna port. The method may further include using the determined transmission quality value for at least one of link adaptation, rank adaptation, or power control.

The above and other aspects and embodiments are described below with reference to the accompanying drawings.

BRIEF DESCRIPTION OF THE DRAWINGS

The accompanying drawings, which are incorporated herein and form part of the specification, illustrate various embodiments of the present disclosure and, together with the description, further serve to explain the principles of the disclosure and to enable a person skilled in the pertinent art to make and use the embodiments disclosed herein. In the drawings, like reference numbers indicate identical or functionally similar elements.

Figure 3A:
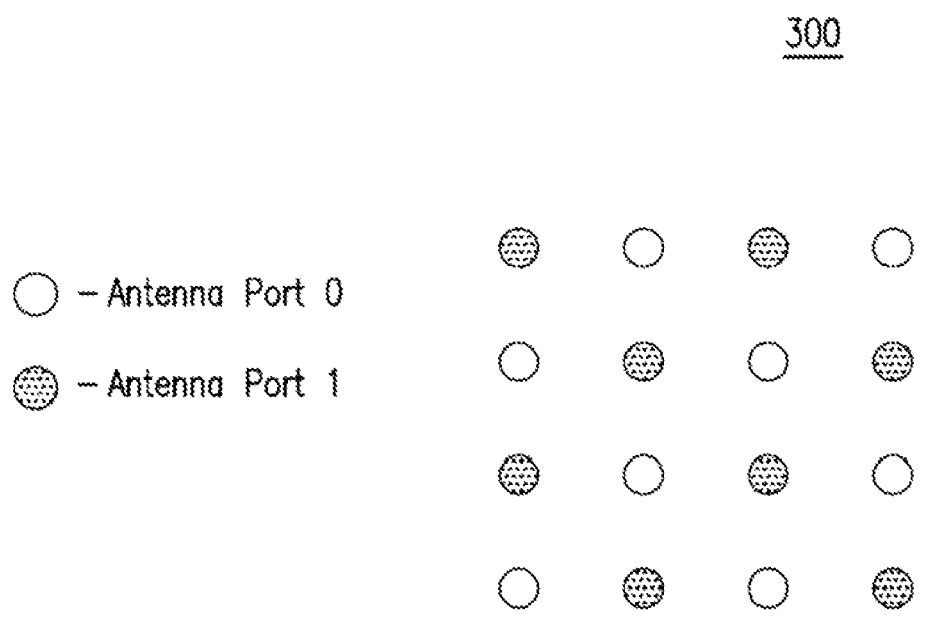

FIG. 3A illustrates geographically separated antenna ports.

DETAILED DESCRIPTION

In exemplary embodiments of the disclosed devices and methods, performance in a network that has geographically interleaved antenna ports is improved based on determining and reporting reference signal power from a communication device to a base station. By recognizing that the reference signal received power from each antenna port will be different depending on the distance of the communication device from each of the antenna ports, the communication devices and base stations operating in accordance with exemplary embodiments of the present invention are able to apply specific measurement and per-port reporting procedures to improve the accuracy of reference signal received power reports, thus improving performance in the network.

Figure 1:
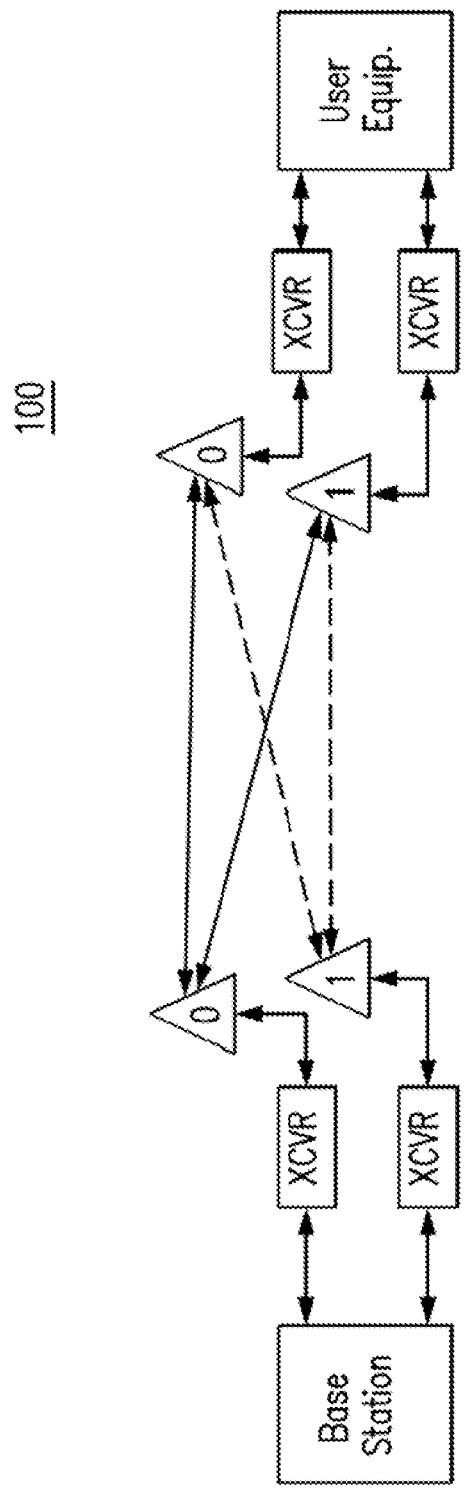
FIG. 1 illustrates a Multiple-Input Multiple-Output (MIMO) communication system.
Figure 2:
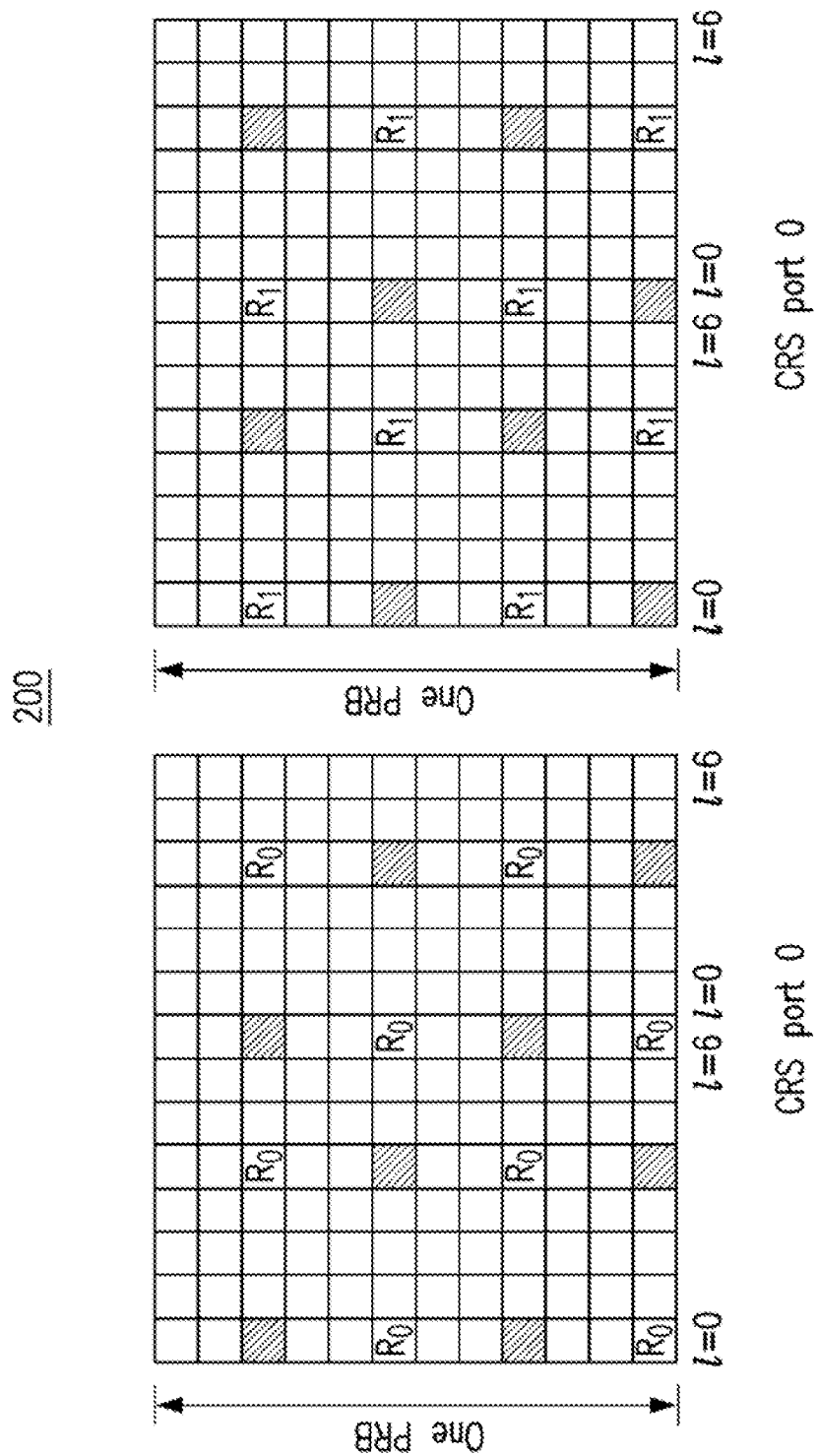
FIG. 2 is a reference signal resource grid corresponding to CRS ports 0 and 1.
Figure 3B:
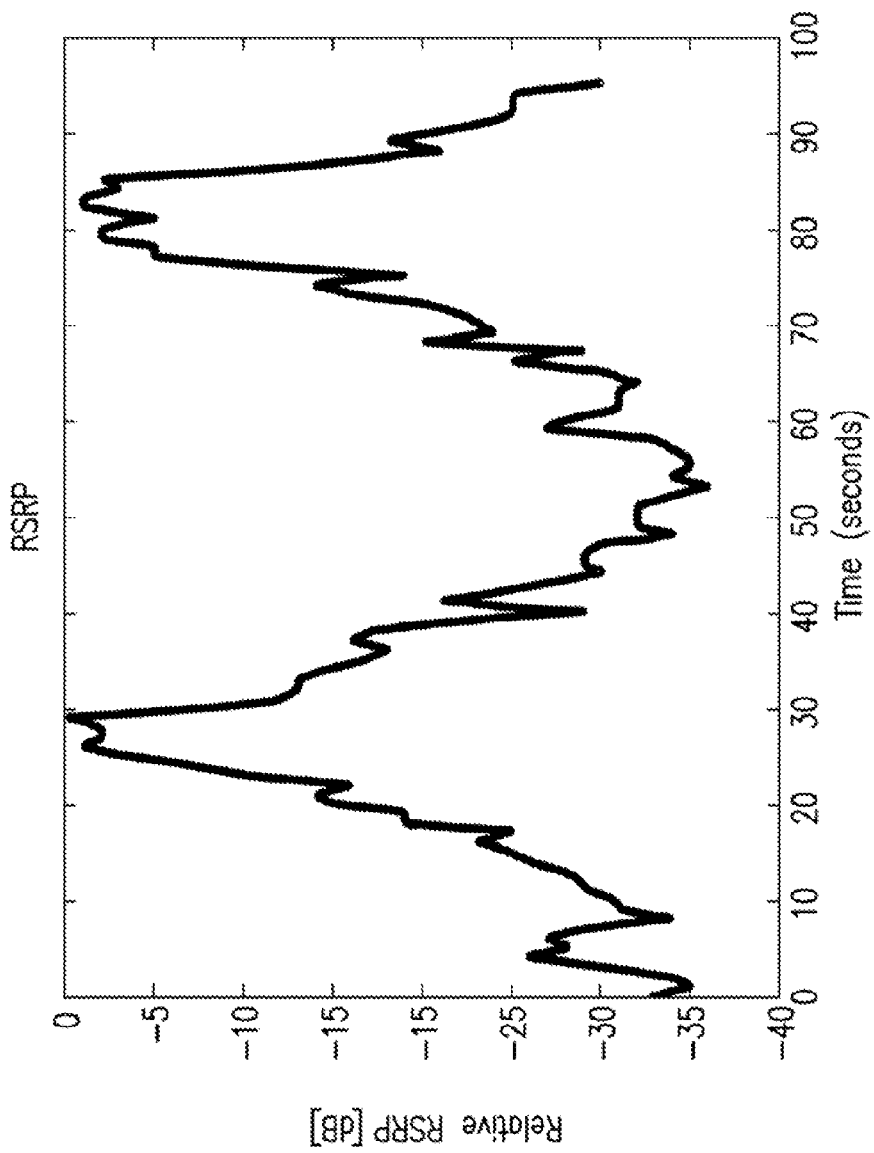
FIG. 3B is a graph depicting the reported signal strength variations of a UE communication device moving between interleaved antenna ports.
Figure 3C:
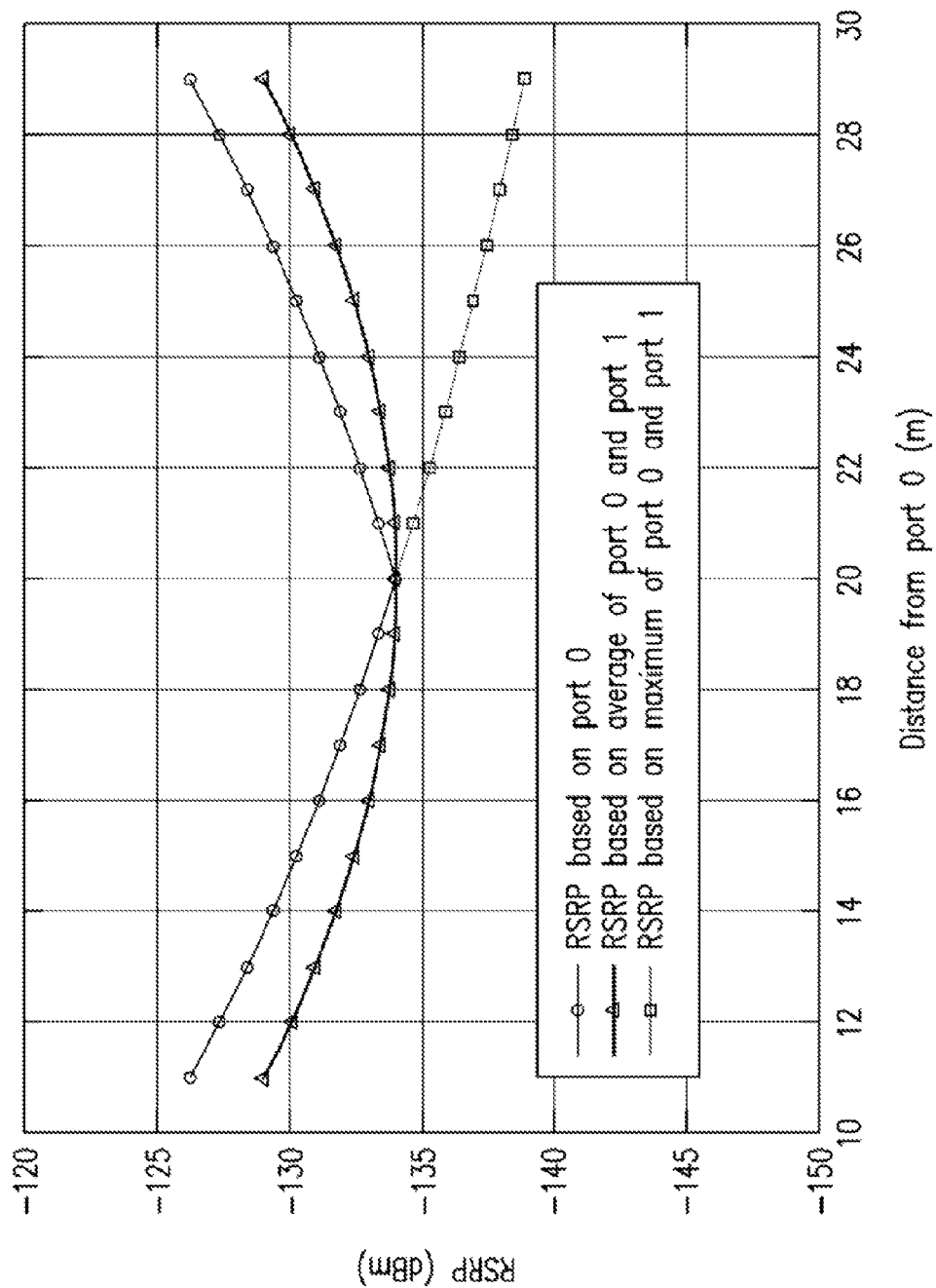
FIG. 3C is a graph depicting RSRP values determined based on port 0, an average of port 0 and port 1, and a maximum of port 0 and port 1.
Figure 4:
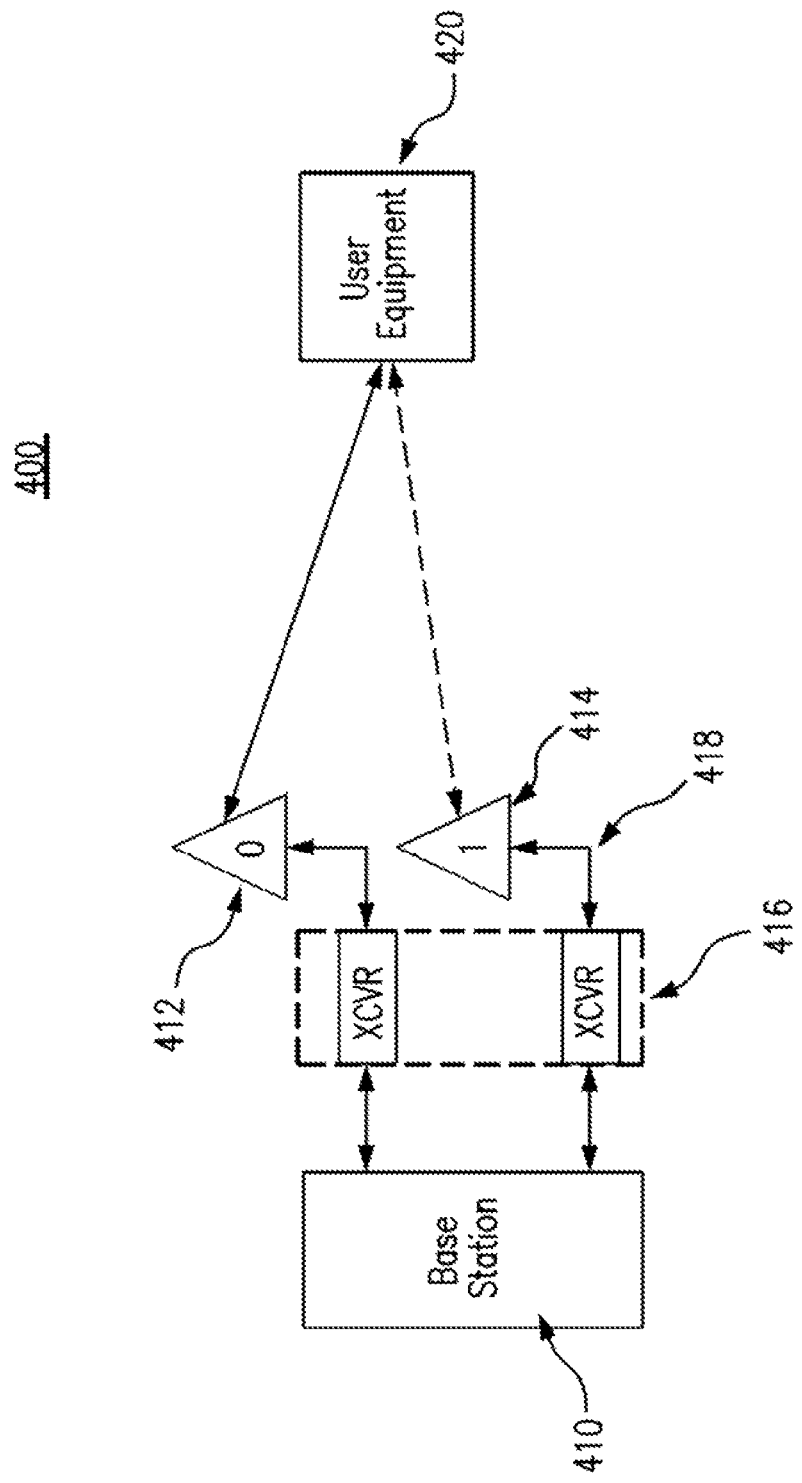
FIG. 4 illustrates a network in accordance with exemplary embodiments of the present invention.

FIG. 4 illustrates an example wireless network 400. As shown, wireless network 400 includes at least one base station 410 and at least one wireless user equipment (UE) communication device 420. Examples of wireless UE communication devices include mobile telephones, personal digital assistants, electronic readers, portable electronic tablets, personal computers, and laptop computers.

The base station 410 further includes a plurality of remotely located antennas 412, 414. Each of the antennas 412, 414 is geographically separated from the other. In an indoor deployment, for example, the antennas 412, 414 may be located on the same or different floors of an office building, parking garage, stadium, or other structure. Their spacing may range from a few meters to opposing ends of a structure. Alternatively, in a large-scale or outdoor deployment, they may be located in different structures or several kilometers away from each other. Their spacing does not have to be uniform, and may be determined based on multiple factors including, but not limited to transmission range or environmental constraints.

As shown in FIG. 4, antennas 412, 414 may be coupled to one or more transceivers 416, for example, via a fiber-optic cable connection 418. According to an exemplary embodiment of the present invention, antennas 412, 414 are configured to transmit on a particular port of the cell. These antenna ports may correspond, for example, to ports 0 and 1, as described in the LTE specification. In this configuration, the base station 410 transmits a series of port-specific reference signals from each of antenna ports 412, 414, which may be received by one or more UE communication devices 420. These reference signals may be, for example, cell-specific reference signals (CRS) in accordance with the LTE specification.

Figure 5:
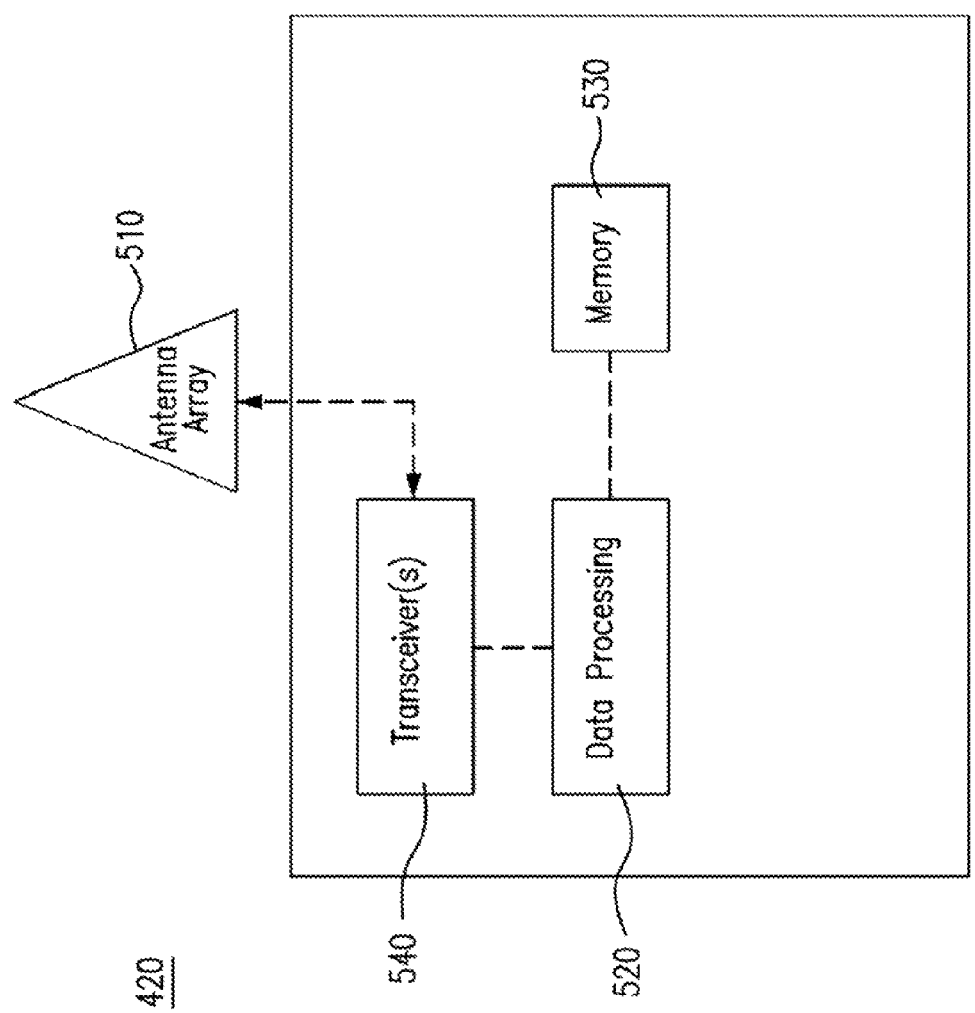
FIG. 5 is a block diagram of a UE communication device in accordance with exemplary embodiments of the present invention.

FIG. 5 illustrates a block diagram of an exemplary UE communication device 420. As shown in FIG. 5, the UE communication device may include: an antenna array 510, which includes one or more antennas, a data processing system 520, which may include one or more microprocessors and/or one or more circuits, such as an application specific integrated circuit (ASIC), field-programmable gate arrays (FPGAs), or the like, and a data storage or memory system 530, which may include one or more non-volatile storage devices and/or one or more volatile storage devices (e.g., random access memory (RAM)). The antenna array 510 is connected to transceiver 540, which is configured to transmit and receive signals via the antenna array 510.

In embodiments where data processing system 520 includes a microprocessor, computer readable program code may be stored in a computer readable medium, such as, but not limited to, magnetic media (e.g., a hard disk), optical media (e.g., a DVD), memory devices (e.g. random access memory), and the like. In some embodiments, computer readable program code is configured such that when executed by a processor, the code causes the data processing system 520 to perform steps described below (e.g. steps described below with reference to the flow charts shown in FIGS. 8 and 9). In other embodiments, the UE communication device 420 is configured to perform steps described above without the need for code. That is, for example, data processing system 520 may consist of one or more ASICs. Hence, the features of the present invention described above may be implemented in hardware and/or software. For example, in particular embodiments, the functional components of the UE communication device 420 described above may be implemented by data processing system 520 executing computer instructions, by data processing system 520 operating independent of any computer instructions, or by any suitable combination of hardware and/or software.

Figure 6:
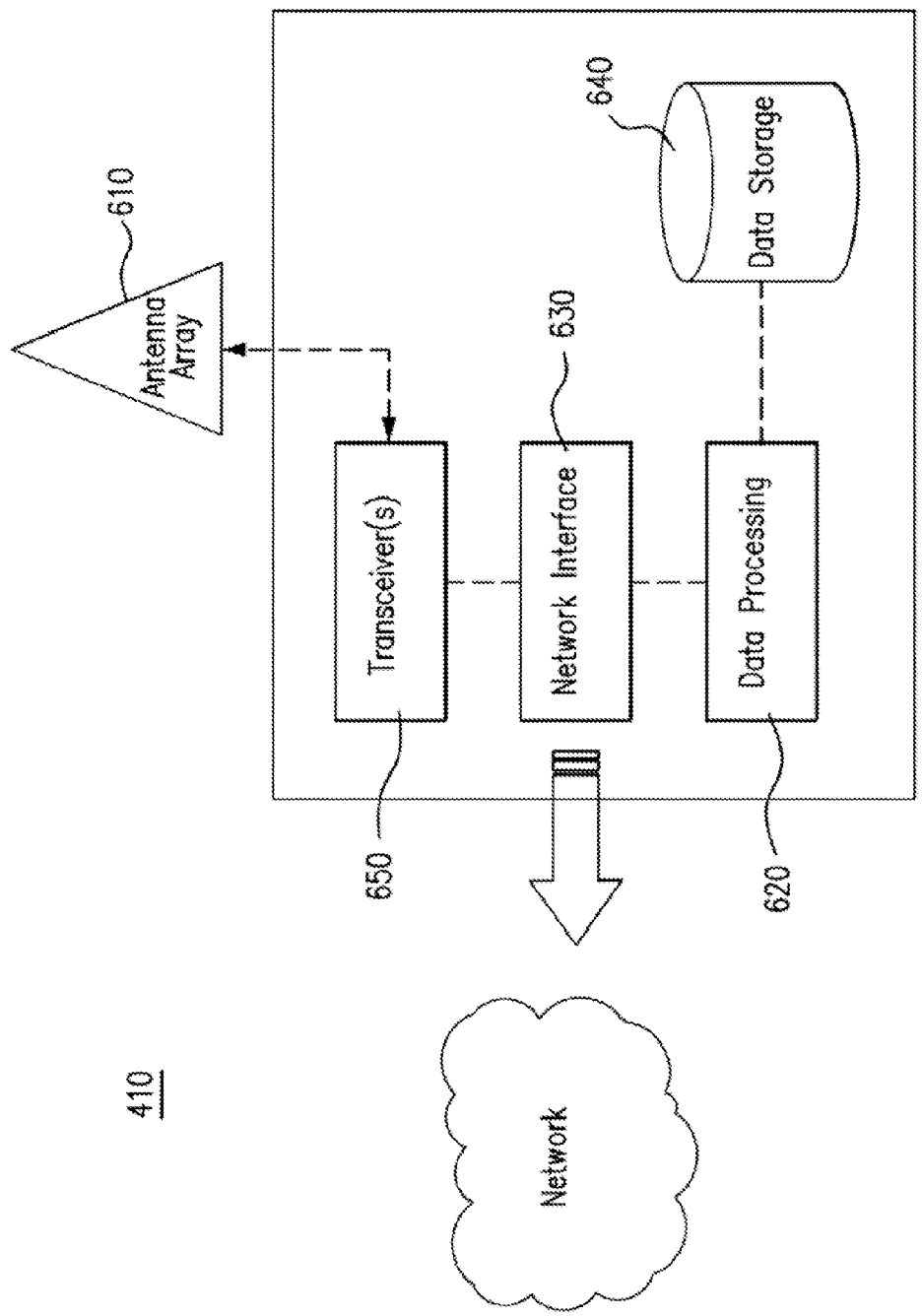
FIG. 6 is a block diagram of a base station in accordance with exemplary embodiments of the present invention.

FIG. 6 illustrates a block diagram of an exemplary base station 410. As shown in FIG. 6, the base station 410 may include: a data processing system 620, which may include one or more microprocessors and/or one or more circuits, such as an application specific integrated circuit (ASIC), field-programmable gate arrays (FPGAs), and the like; a network interface 630; and a data storage system 640, which may include one or more non-volatile storage devices and/or one or more volatile storage devices (e.g., random access memory (RAM)). The network interface 630 is connected to transceiver 650, which is configured to transmit and receive signals via an antenna array 610. According to an aspect of the present invention, the antenna array may include one or more geographically separated antenna ports. For instance, antenna array 610 may include a first antenna port 0, and a second antenna port 1, which correspond to ports 0 and 1 of the LTE specification. In an exemplary embodiment of the disclosed devices and methods, the base station 410 is a Node B (NB) or Evolved Node B (eNB).

In embodiments where data processing system 620 includes a microprocessor, computer readable program code may be stored in a computer readable medium, such as, but not limited, to magnetic media (e.g., a hard disk), optical media (e.g., a DVD), memory devices (e.g., random access memory), and the like. In some embodiments, computer readable program code is configured such that when executed by a processor, the code causes the data processing system 620 to perform steps described below (e.g., steps described below with reference to the flow chart shown in FIG. 10). In other embodiments, the base station 410 is configured to perform steps described above without the need for code. That is, for example, data processing system 620 may consist merely of one or more ASICs. Hence, the features of the present invention described above may be implemented in hardware and/or software. For example, in particular embodiments, the functional components of the base station described above may be implemented by data processing system 620 executing computer instructions, by data processing system 620 operating independent of any computer instructions, or by any suitable combination of hardware and/or software.

In exemplary embodiments of the disclosed devices and methods, the base station 410 and the wireless UE communication device 420 may be configured to communicate with each other using an Space Frequency Block Code (SFBC) transmission scheme to communicate orthogonal frequency division multiplexed (OFDM) symbols that include data elements and reference symbols.

Figure 7:
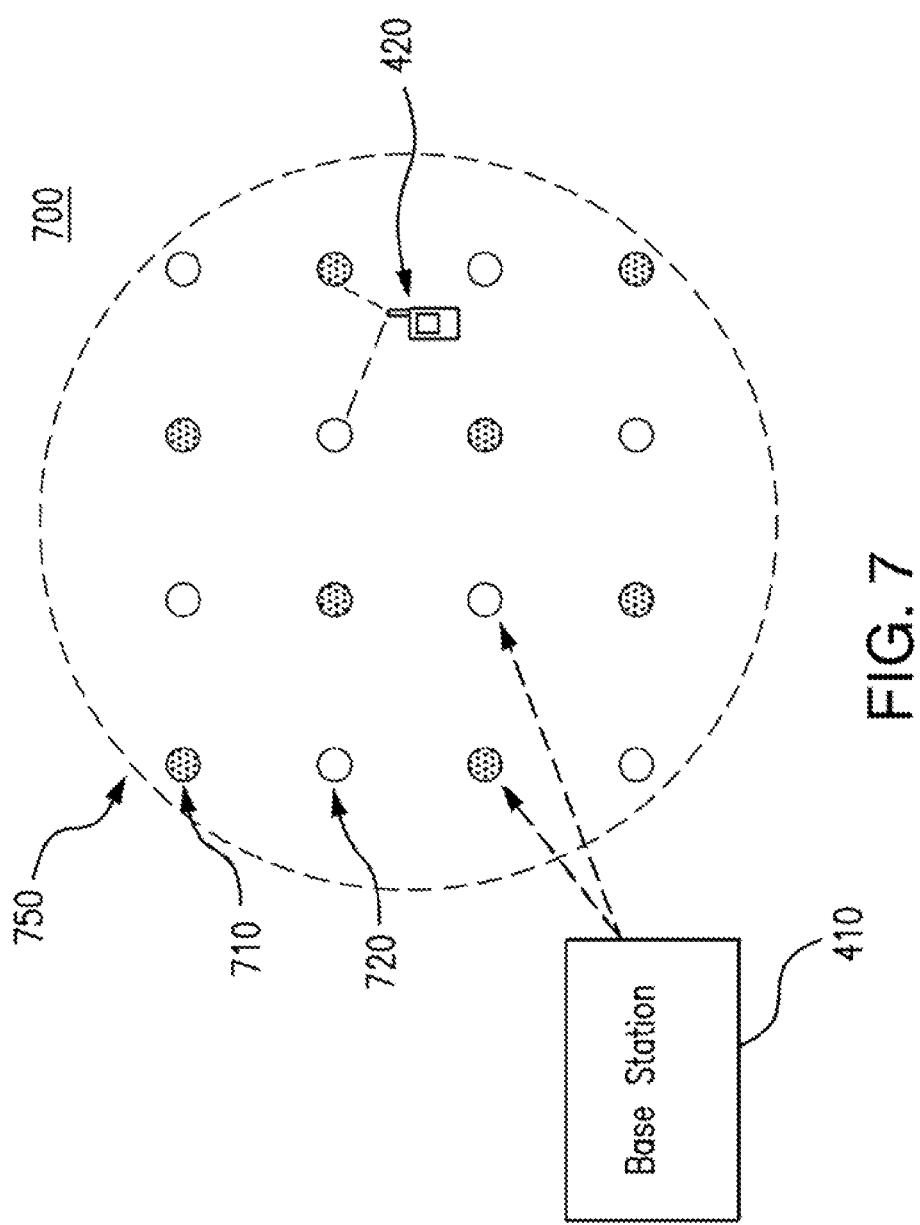
FIG. 7 is a schematic diagram illustrating a network with interleaved antenna ports and a UE communication device, in accordance with exemplary embodiments of the present invention.

Referring to FIG. 7, a UE communication device 420 is in communication with a base station 410 that utilizes a distributed antenna configuration. Geographically separated antennas 710, 720, where alternating antennas transmit on a first and second antenna port of the base station 410, are shown in FIG. 7. Each of the antenna ports may transmit a reference signal that can be received by the UE communication device 420. When the UE communication device 420 is at various locations within cell 750, the reference signals from each of the antenna ports will be received with varying power depending upon the UE communication device's location.

Figure 8:
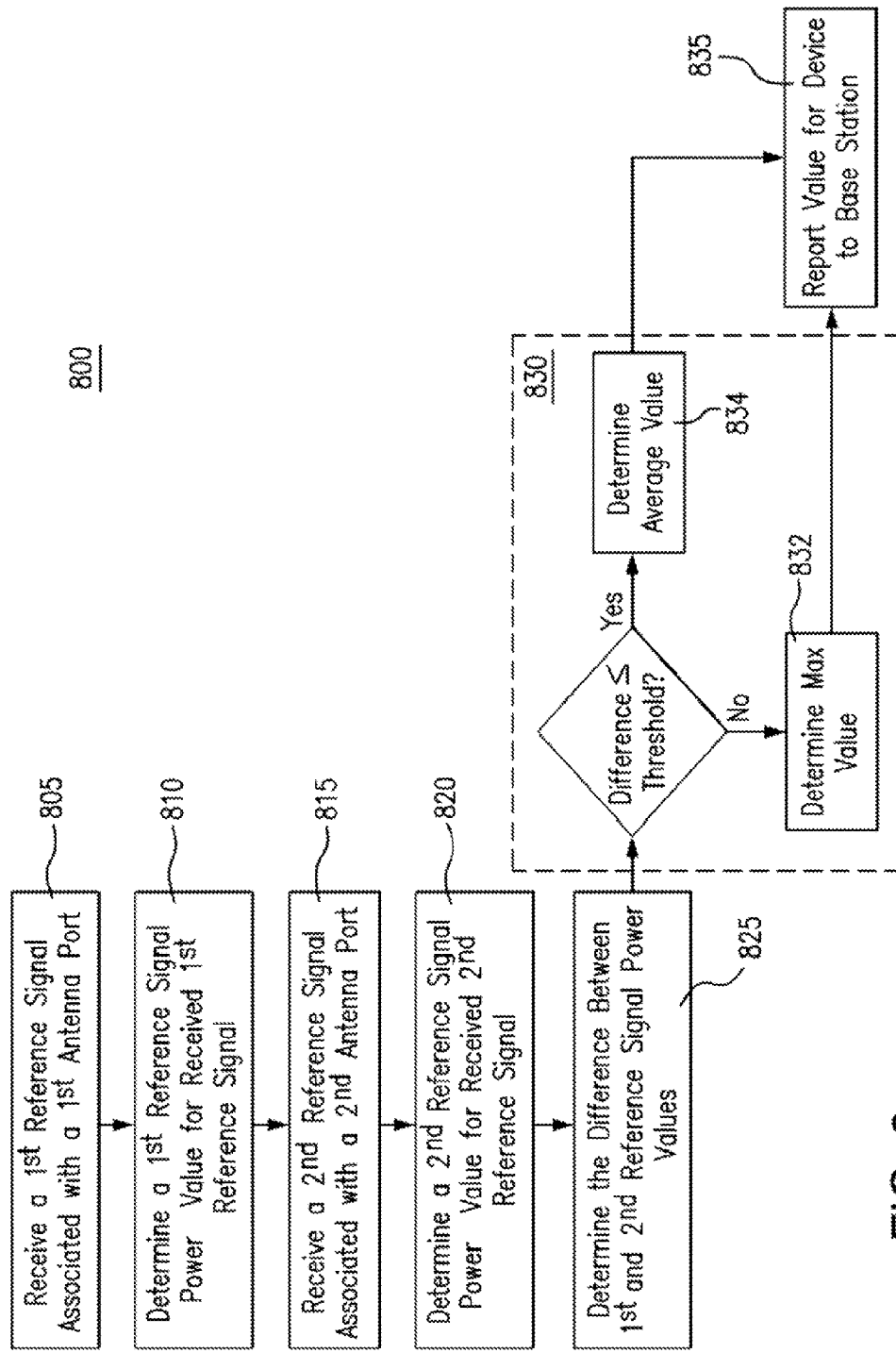
FIG. 8 is a flow chart illustrating a process for improving performance in a network with geographically separated antenna ports, in accordance with exemplary embodiments of the present invention.

Referring now to FIG. 8, a flow chart 800 illustrating a process for improving performance in a network with geographically separated antenna ports, in accordance with exemplary embodiments of the disclosed devices and methods, is shown. According to aspects of the embodiment, performance is improved by determining reference signal power received on a UE communication device 420 and reporting a measured value to a base station 410 with improved accuracy.

In the first step of the process 805, a first signal is received by a UE communication device 420 from a base station 410. This signal may include, among other symbols, a reference signal that is associated with an antenna port of the base station. For example, the reference signal may be a cell-specific reference signal (CRS) from an antenna port of the base station 410, such as a CRS-port 0 in accordance with the LTE specification.

In step 810, the UE communication device 420 determines a first reference signal power value based on the received reference signal. This value may be, for example, a reference signal received power (RSRP) as used in an LTE deployment.

In step 815, a second signal is received by the UE communication device 420 from the base station 410. As with the first signal, this signal may include a reference signal that is associated with an antenna port of the base station 410. For example, the reference signal may be a cell-specific reference signal (CRS) from a second antenna port of the base station 410, such as a CRS-port 1 in accordance with the LTE specification.

In step 820, the UE communication device 420 determines a second reference signal power value based on the second received reference signal, such as an RSRP value.

In step 825, the IUE communication device 420 determines the difference between the first reference signal power value and the second reference signal value.

In step 830, the UE communication device 420 determines a third reference signal power value for the UE communication device, which is then reported at step 835 to the base station 410 as a measured power value, such as the measured RSRP for the UE communication device 420.

The measured RSRP for the UE communication device 420 can be utilized to improve data transmission settings and overall system performance, as well as to improve handover and cell reselection decisions. The RSRP value represents the signal strength of the LTE cell, and thus, can be used in ranking different cells. Further, knowledge regarding RSRP allows a base station 410 to determine optimum power settings, transmission protocols, and system settings. For instance, RSRP may be considered in link adaptation, rank adaptation, and in managing HARQ issues.

According to an aspect of the present invention, the reported measured power value is dependent on whether the difference between the first and the second reference signal power values is greater or less than a threshold value. If the difference is less than the threshold, an average of the two reference signal power values is reported as the measured value for the UE communication device 420, shown at step 834. This may be, for instance, a weighted average. A weighted average may be appropriate where the communications system includes disparate power levels for different reference signals or if there is a preference for a particular antenna port's measurement. For example, a weighted average may be appropriate in a heterogeneous network (HetNet) with port 0 for Marco and port 1 for Pico.

If the difference is greater than the threshold, an average of the two reference signal power values would not necessarily be an accurate reflection of the actual channel condition associated with a cell. Accordingly, the maximum value between the first and second reference signal power values may be reported in this instance, shown at step 832.

For example, the first reference signal power value can be an RSRP associated with a first port, $RSRP_{Port0}$, and the second reference signal power value can be an RSRP associated with a second port. $RSRP_{Port1}$. In this case, the evaluation of the difference between the first and second power values is given by:

$$|RSRP_{Port0} - RSRP_{Port1}| \leq \text{Threshold} \qquad (I)$$

The threshold value is a power value that represents the allowable difference between the power on ports 0 and 1 to implement an averaging scheme. This value may be predetermined, or dynamically adjusted by either a base station 410 or UE communication device 420. The value may be determined based on a number of factors, including, for example, environmental factors, channel estimation, or any network optimization goals. The threshold may be in the range of 3 db to 6 b; however, the value may also fall in the range of 0 dB to 25 dB. Essentially, the threshold may be specifically and/or dynamically determined to suit any desired operating characteristic or condition.

If the result of Equation 1 is "true," and the difference is less than the threshold, an average value of the first and second RSRP is reported to the base station 410 as the measured RSRP for the UE communication device 420:

$$RSRP_{UE} = (RSRP_{Port0} + RSRP_{Port1})/2 \qquad (II)$$

The average value may be stored in memory 530.

However, in the case where $$|RSRP_{Port0} - RSRP_{Port1}| > \text{Threshold} \qquad (III)$$

the averaging method of Equation (II) may no longer be effective. This would correspond to a situation where the UE communication device 420 is much closer to one of the antenna ports 1 or 0. As shown in FIG. 7, a UE communication device within a cell including geographically separated antennas may be closer to one of antenna port 0 or 1. In this case, the averaging method would result in an artificially low reported RSRP value. For instance, in the case where the UE communication device 420 was adjacent either antenna port 0 or 1, the reported value could be reduced by as much as half using the averaging method of Equation (II). Accordingly, the maximum value between the two port-specific RSRPs should be reported:

$$RSRP_{UE} = \max(RSRP_{Port0}, RSRP_{Port1}) \quad (IV)$$

The maximum value may be stored in memory 530.

Setting the reported $RSRP_{UE}$ as show in Equation (IV) best reflects the actual channel conditions associated with a given cell when a UE communication device 420 receives a much stronger reference signal on one of a plurality of ports, for instance, when the UE communication device 420 is located near antenna port 1 or port 0.

According to an aspect of the present invention, a UE communication device 420, such as the device diagrammed in FIG. 5, is operable in a network with a plurality of geographically spaced antenna ports and contains at least one antenna, a memory, a transceiver, and data processing resources, which together, are configured to measure and report a reference signal power value as detailed in the flow chart of FIG. 8.

According to embodiments of the disclosed devices and methods, port-specific values of reference signal power may be determined and reported to a base station 410. This per antenna port reporting can provide a serving cell with improved information regarding the channel condition of individual links. Accordingly, a base station 410 may have increased flexibility to measure RSRP, selectively control transmission properties, and/or maintain performance statistics.

Figure 9:
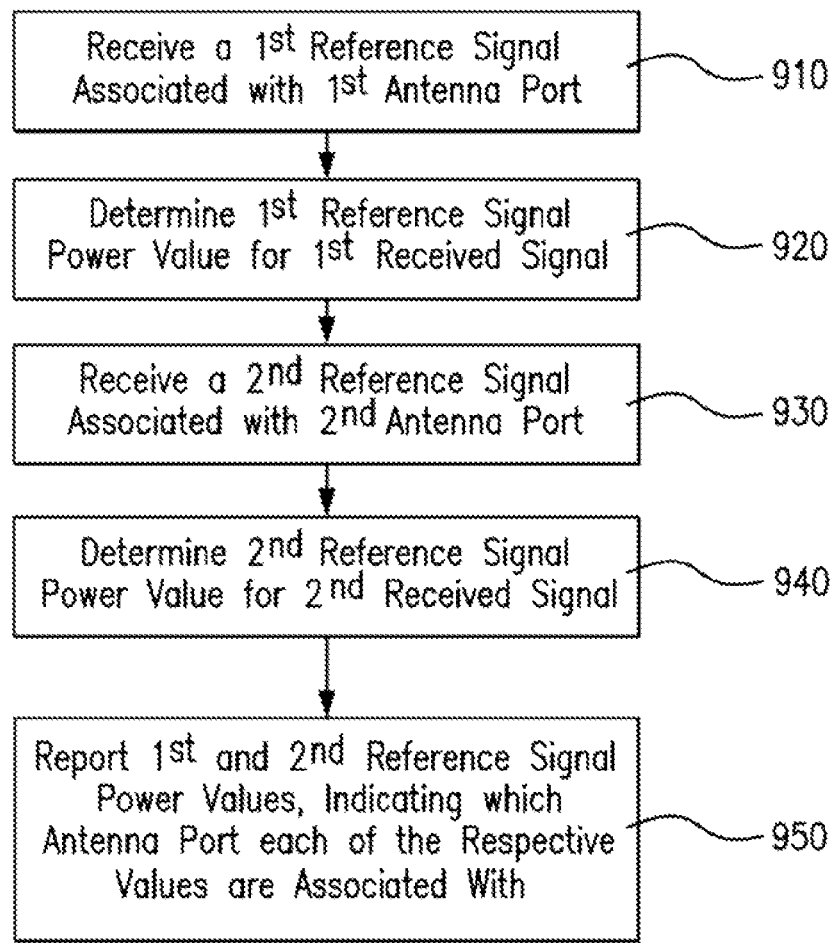
FIG. 9 is a flow chart illustrating a process for improving performance in a network with geographically separated antenna ports, in accordance with exemplary embodiments of the present invention.

Referring to FIG. 9, a flow chart 90) illustrating a process for improving performance in a network with geographically separated antenna ports, in accordance with exemplary embodiments of the disclosed devices and methods, is shown.

In the first step 910, a first reference signal is received from a base station 410, which is associated with an antenna port of the base station. For instance, the reference signal may be a cell-specific reference signal (CRS) transmitted from a first antenna port, $Port_0$, of a base station 410 operating in an LTE deployment. The base station 410 may include multiple antenna ports that are geographically separated from each other.

In step 920, a first reference signal power value for the received reference signal is determined. This value may be, for instance, a reference signal received power $RSRP_0$.

In step 930, a second reference signal is received from the base station 410, which is associated with another antenna port of the base station. For instance, the reference signal may be a cell-specific reference signal (CRS) transmitted from a second antenna port, $Port_1$, of the base station 410.

In step 940, a second reference signal power value for the second received reference signal is determined. This value may be, for instance, a second reference signal received power $RSRP_1$.

In step 950, the determined values, for example $RSRP_0$ and $RSRP_1$, are reported to the base station 410. The values are reported in a manner that indicates the antenna port associated with the signal used to determine each respective value. As such, the base station is able to distinguish between the references signal power values associated with different ports. For instance, a reference signal power value associated with a first antenna port may be reported first, and a reference signal power value associated with a second antenna port may be reported second. In this example, the base station can recognize per-port channel characteristics based on the order in which the values are received. In other exemplary configurations, the communication device 420 may format the first and second reference signal power values in order to indicate which antenna port each value is associated with, for instance, through inclusion of additional identification information, frequency selection, or signal levels.

According to an aspect of the present invention, a UE communication device 420, such as the device diagrammed in FIG. 5, is operable in a network with a plurality of geographically spaced antenna ports, and contains at least one antenna, a memory, a transceiver, and a data processing resources, which together, are configured to measure and report reference signal power values as detailed in the flow chart of FIG. 9.

Figure 10:
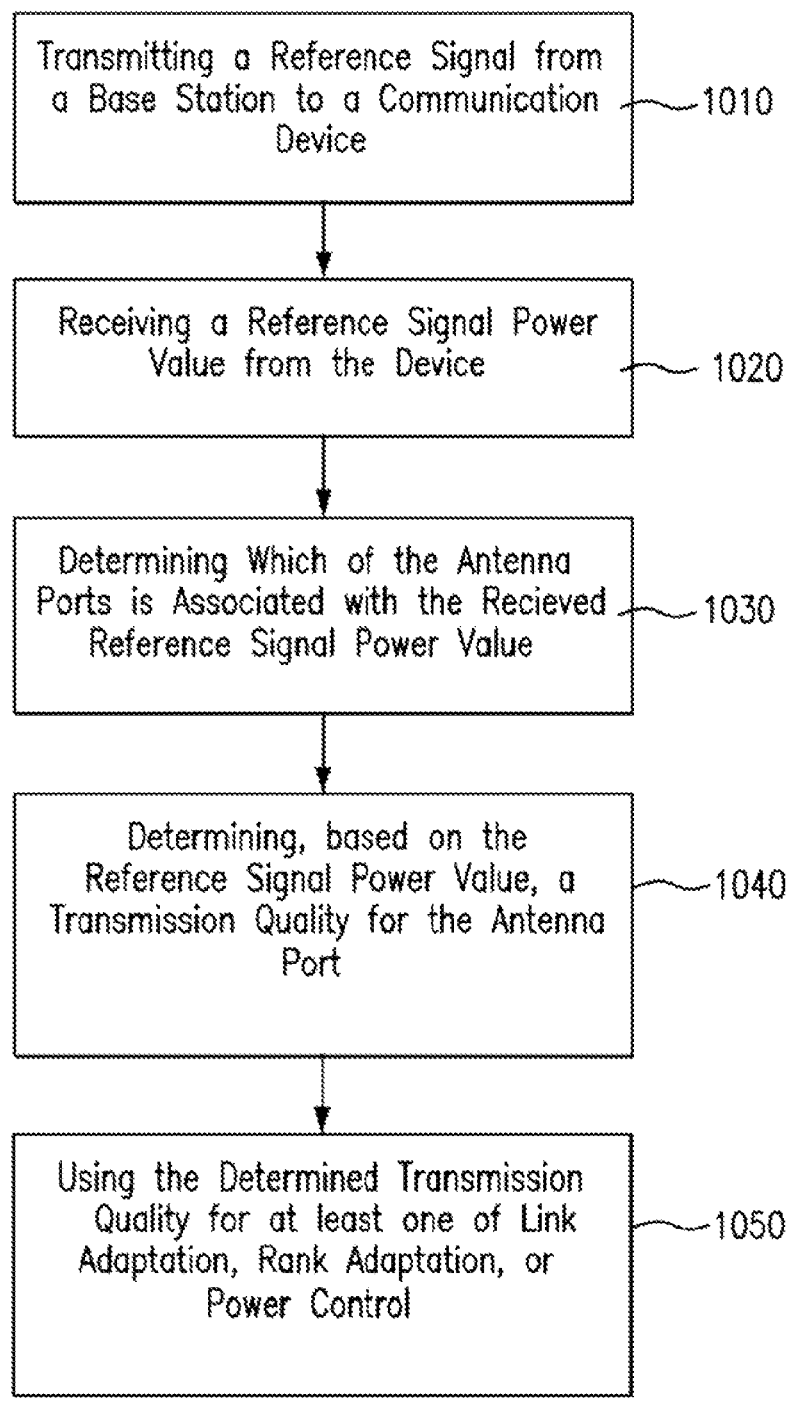
FIG. 10 is a flow chart illustrating a process for improving performance in a network with geographically separated antenna ports, in accordance with exemplary embodiments of the present invention.

Referring now to FIG. 10, a flow chart 1000 illustrating a process for improving performance in a network with geographically separated antenna ports, in accordance with exemplary embodiments of the disclosed devices and methods, is shown. The process is based on received reference signal power values from at least one UE communication device 420 that include an indication of the antenna port associated with the value. This process may be implemented by a base station 410, for example, a base station as diagrammed in FIG. 6 in communication with one or more UE communication devices 420 in an LTE deployment.

In the first step 1010, a base station transmits a reference signal to a communication device from an antenna port. For instance, the base station may periodically transmit a cell-specific reference signal (CRS) from one of a plurality of geographically separated antenna ports.

If a report regarding reference signal power, such as a reference signal received power (RSPR) value, is received from a UE communication device at step 1020, the base station determines which of the antenna ports is associated with the received reference signal power value at step 1030. This may be accomplished, for example, by recognizing additional identification information reported with the reference signal power value, frequency selection, or signal levels. Alternatively, if the base station receives multiple reference signal power values, the associated antenna ports for each value may be determined based on the order in which the values are received. At step 1040, a transmission quality based on a reported value is determined. This transmission quality may be either a general or a port-specific transmission quality, which can be stored in data storage 640.

In step 1050, the base station may use the determined transmission quality to adjust communication settings, for instance to improve data transmission on the network or optimize power settings. For instance, the determined transmission quality may be used for link adaptation, rank adaptation, control of UE power configuration, or the like.

The disclosed thresholding techniques and measurement of port-specific reference values are not limited to RSRP or CRS measurements on ports 0 and 1 of an LTE deployment. For example, the disclosed devices and methods may be applied to CRS ports 2 and 3, or to 8 Channel State Information Reference Signals (CSI-RS) as well.

While various embodiments have been described above, it should be understood that they have been presented by way of example only, and not limitation. Thus, the breadth and scope of the present disclosure should not limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

What is claimed is:

1. A method for improving performance in a network with geographically separated antenna ports based on determining and reporting reference signal power from a communication device to a base station, comprising:
receiving, from the base station, a first reference signal associated with a first antenna port of the base station;
determining a first reference signal power value for the received first reference signal; receiving, from the base station, a second reference signal associated with a second antenna port of the base station;
determining a second reference signal power value for the received second reference signal;
determining the difference between the first reference signal power value and the second reference signal power value;
determining a third reference signal power value for the communication device based on said determined difference;
reporting said third reference signal power value to the base station; and
if said determined difference is less than or equal to a predetermined threshold value, determining an average value by averaging said first reference signal power value and said second reference signal power value, wherein said third reference signal power value reported to said base station is said average value.

2. The method of claim 1, wherein the predetermined threshold value is a value between about 3 dB and 6 dB.

3. The method of claim 1, wherein said average value is a weighted average of at least said first reference signal power value and said second reference signal power value.

4. The method of claim 1, wherein, if said determined difference is greater than a predetermined threshold value, the method further comprises: determining a maximum value by comparing said first reference signal power value and said second reference signal power value; and wherein said third reference signal power value reported to said base station is said maximum value.

5. The method of claim 4, wherein the predetermined threshold value is a value between about 3 dB and 6 dB.

6. The method of claim 1, wherein said first reference signal is a cell-specific reference signal (CRS) for said first antenna port and said second reference signal is a cell-specific reference signal (CRS) for said second antenna port.

7. The method of claim 1, wherein said first reference signal power value and said second reference signal power value are measured reference signal received power (RSRP) values and said third reference signal received power (RSRP) value is reported as a measured reference signal received power (RSRP) value for the communication device.

8. The method of claim 1, wherein the network is a multiple-input multiple-output (MIMO) wireless network.

9. A communication device operable in a network with a plurality of geographically separated antenna ports, comprising:
a processor;
a transceiver coupled to said processor;
an antenna coupled to said transceiver; wherein, said processor is configured to:
determine a first reference signal power value based on a first reference signal received on said antenna, wherein said first reference signal is received from a first of said geographically separated antenna ports,
determine a second reference signal power value based on a second reference signal received on said antenna, wherein said second reference signal is received from a second of said geographically separated antenna ports,
determine the difference between the first reference signal power value and the second reference signal power value, determine a third reference signal power value for the communication device based on said determined difference,
report said third reference signal power value to a base station;
if said determined difference is less than or equal to a predetermined threshold value, determine an average value by averaging said first reference signal power value and said second reference signal power value; and
store said average value in the memory, wherein said third reference signal power value reported to said base station is said average value.

10. The device of claim 9, wherein the predetermined threshold value is a value between about 3 dB and 6 dB.

11. The device of claim 9, wherein said average value is a weighted average of at least said first reference signal power value and said second reference signal power value.

12. The device of claim 9, further comprising a memory, wherein, if said determined difference is greater than a predetermined threshold value, the processor is configured to: determine a maximum value by comparing said first reference signal power value and said second reference signal power value; and store said maximum value in the memory, wherein said third reference signal power value reported to said base station is said maximum value.

13. The device of claim 12, wherein the predetermined threshold value is a value between about 3 dB and 6 dB.

14. The device of claim 9, wherein said first reference signal is a cell-specific reference signal (CRS) for said first antenna port and said second reference signal is a cell-specific reference signal (CRS) for said second antenna port.

15. The device of claim 9, wherein said first reference signal power value and said second reference signal power value are measured reference signal received power (RSRP) values and said third reference signal received power (RSRP) value is reported as a measured reference signal received power (RSRP) value for the communication device.

16. The device of claim 9, wherein said communication device is configured to operate on a multiple-input multiple-output (MIMO) wireless network.

17. A method for improving performance in a network with geographically separated antenna ports based on determining and reporting reference signal power from a communication device to a base station, comprising:
receiving, from the base station, a first reference signal associated with a first antenna port of the base station;
determining a first reference signal power value for the received first reference signal;
receiving, from the base station, a second reference signal associated with a second antenna port of the base station;
determining a second reference signal power value for the received second reference signal; and
reporting said first and second reference signal power values to the base station, wherein said reporting indicates the antenna port associated with the reference signal used to determine said first reference signal power value and indicates the antenna port associated with the reference signal used to determine said second reference signal power value, in an order in which the values are received.

18. The method of claim 17, wherein said first reference signal is a cell-specific reference signal (CRS) for said first antenna port and said second reference signal is a cell-specific reference signal (CRS) for said second antenna port.

19. The method of claim 17, wherein said first reference signal power value and said second reference signal power value are reference signal received power (RSRP) values.

20. The method of claim 17, wherein the network is a multiple-input multiple-output (MIMO) wireless network.

* * * * *